(12) United States Patent
Xu et al.

(10) Patent No.: US 10,940,552 B2
(45) Date of Patent: Mar. 9, 2021

(54) ONLINE CUTTING DEVICE FOR WHEEL SPINNING FLASH

(71) Applicant: CITIC Dicastal CO., LTD., Hebei (CN)

(72) Inventors: Zuo Xu, Qinhuangdao (CN); Bowen Xue, Qinhuangdao (CN); Baojun Zhang, Qinhuangdao (CN); Jiandong Guo, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 0 days.

(21) Appl. No.: 16/508,133

(22) Filed: Jul. 10, 2019

(65) Prior Publication Data

US 2020/0147704 A1    May 14, 2020

(30) Foreign Application Priority Data

Nov. 8, 2018 (CN) .......................... 201811321741.4

(51) Int. Cl.
| | | |
|---|---|---|
| *B23D 79/02* | (2006.01) | |
| *B23D 19/00* | (2006.01) | |
| *B23D 33/02* | (2006.01) | |

(52) U.S. Cl.
CPC ............. *B23D 79/02* (2013.01); *B23D 19/00* (2013.01); *B23D 33/02* (2013.01)

(58) Field of Classification Search
CPC ......... B23D 79/02; B23D 19/00; B23D 33/02
See application file for complete search history.

(56) References Cited

U.S. PATENT DOCUMENTS

| | | | |
|---|---|---|---|
| 10,081,061 B2* | 9/2018 | Sun ........................... | B23B 5/28 |
| 10,399,160 B2* | 9/2019 | Liu ........................... | B23Q 5/36 |
| 2015/0063936 A1* | 3/2015 | Azzarello ............... | B23P 23/02 |
| | | | 409/132 |
| 2016/0311215 A1 | 10/2016 | Xue et al. | |
| 2018/0071828 A1* | 3/2018 | Sun ........................ | B23D 79/02 |
| 2019/0022777 A1* | 1/2019 | Liu ........................... | B23B 5/16 |

FOREIGN PATENT DOCUMENTS

| | | |
|---|---|---|
| CN | 203304703 U | 11/2013 |
| CN | 203679398 U | 7/2014 |
| CN | 203712264 U | 7/2014 |
| CN | 204122737 U | 1/2015 |

OTHER PUBLICATIONS

European Search Report in the European application No. 19201490.0, dated Mar. 26, 2020.

\* cited by examiner

*Primary Examiner* — Omar Flores Sanchez
(74) *Attorney, Agent, or Firm* — Syncoda LLC; Feng Ma

(57) ABSTRACT

A wheel spinning flash cutting device includes a rack, a turnover cylinder, a connection rod, a top plate, a first guide rail, a sliding plate, bearing pedestals, first shafts, rollers, a clamping cylinder, a first motor, a belt wheel, a base, a synchronous belt, second shafts, second rails, a support, a cutting blade, a second motor, a feed cylinder and a bracket.

2 Claims, 3 Drawing Sheets

ONLINE CUTTING DEVICE FOR WHEEL SPINNING FLASH

CROSS-REFERENCE TO RELATED APPLICATION

The present application claims benefit of Chinese Patent Application No. 201811321741.4, filed on Nov. 8, 2018, the contents of which are hereby incorporated by reference in their entirety.

BACKGROUND

A spinning process is not strange to manufacturers of aluminum alloy wheels and can obtain wheels with higher performance than wheels manufactured by a pure casting process. This mode is being promoted by more and more enterprises. However, in a spinning production process, a very large spinning flash will be often formed at the top end of a spun wheel due to the influence of a series of factors such as temperature, process and equipment. If this spinning flash is not removed in time, it will seriously affect the production efficiency of machining procedures and aggravate the influence on cutters and machine tools. Therefore, there is a need for an online cutting device for a wheel spinning flash, which can quickly cut and remove the spinning flash of the wheel and provide a regular wheel blank for subsequent procedures.

SUMMARY

The present disclosure relates to a cutting device, and more particularly relates to an improved online cutting device for a wheel spinning flash.

The present disclosure aims to provide a wheel spinning flash cutting device, which may automatically cut a spinning flash of a wheel on line and quickly.

In order to achieve the aforementioned objective, the technical solution of the present disclosure is as follows: a wheel spinning flash cutting device, consists of a rack, a turnover cylinder, a connection rod, a top plate, a first guide rail, a sliding plate, bearing pedestals, first shafts, rollers, a clamping cylinder, a first motor, a belt wheel, a base, a synchronous belt, second shafts, second rails, a support, a cutting blade, a second motor, a feed cylinder and a bracket. The sliding plate, above which the two bearing pedestals are fixed, is connected with the top of the top plate through the first guide rail. The first shafts, above which the rollers are respectively mounted, are fixed in the bearing pedestals through bearings. An output lever of the clamping cylinder fixed above the top plate is connected with the sliding plate. Similarly, the two bearing pedestals are mounted above the base fixed above the top plate, and the first motor is fixed below the base. The second shafts, above which the rollers are mounted and below which the belt wheel is fixed, are fixed in the bearing pedestals through bearings. The first motor drives the two second shafts and the wheel to rotate through the synchronous belt.

A cylinder body of the turnover cylinder is hinged to the rack, and an output lever of the turnover cylinder is hinged with the connection rod below the top plate. The support, on which the second motor is fixed, is connected with a platform of the rack through the second rails. The cutting blade is fixed at the output end of the second motor. The feed cylinder is fixed on the bracket above the rack, and an output lever of the feed cylinder is connected with the support. The second rails, the support, the cutting blade, the second motor and the feed cylinder form a cutting feeding unit of the device.

In a working process, a sensor initially locates the wheel; the clamping cylinder enables the two first shafts to move rightwards; the rollers lift up the wheel away from a roller way and then clamp the wheel; the turnover cylinder enables a turnover frame and the wheel to turn over by degrees through the connection rod to cause the wheel to be in a vertical state; then the first motor drives the wheel to rotate; and after the spinning flash is removed under the action of the cutting feeding unit, the wheel may automatically fall into one side of the rack.

The present disclosure may realize an online cutting function for a wheel spinning flash during use to improve the production efficiency of a machining procedure, and has the characteristics of advanced process, high automation degree, simple structure, low manufacturing cost, safe and stable performance and the like.

LIST OF REFERENCE SYMBOLS

Figure 1:
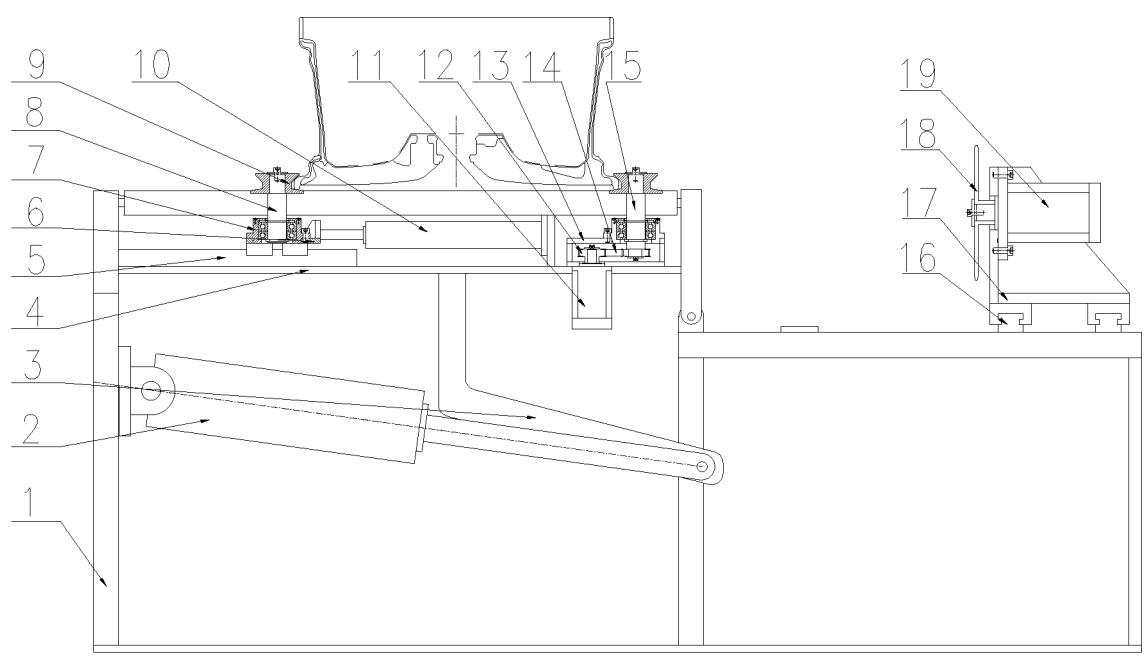
FIG. 1 is a front view of an improved online cutting device for a wheel spinning flash of the present disclosure.
Figure 2:
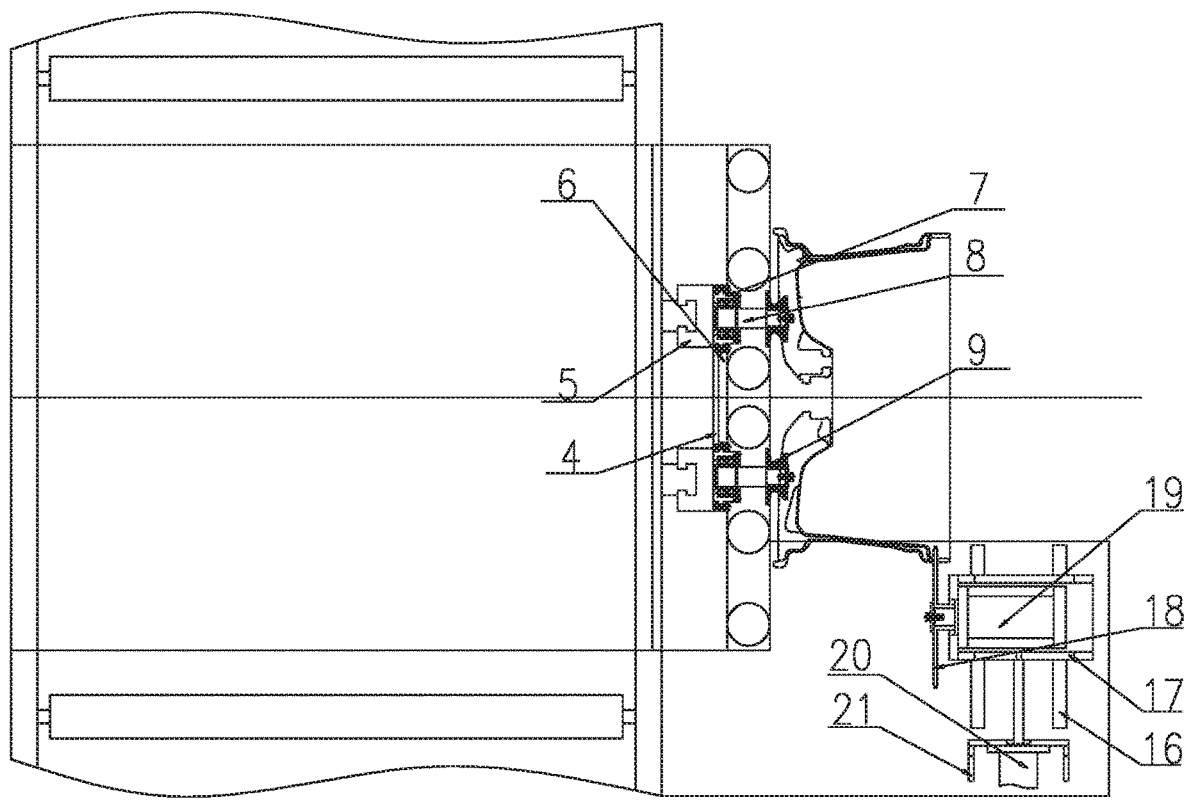
FIG. 2 is a top view of an improved online cutting device for a wheel spinning flash of the present disclosure.
Figure 3:
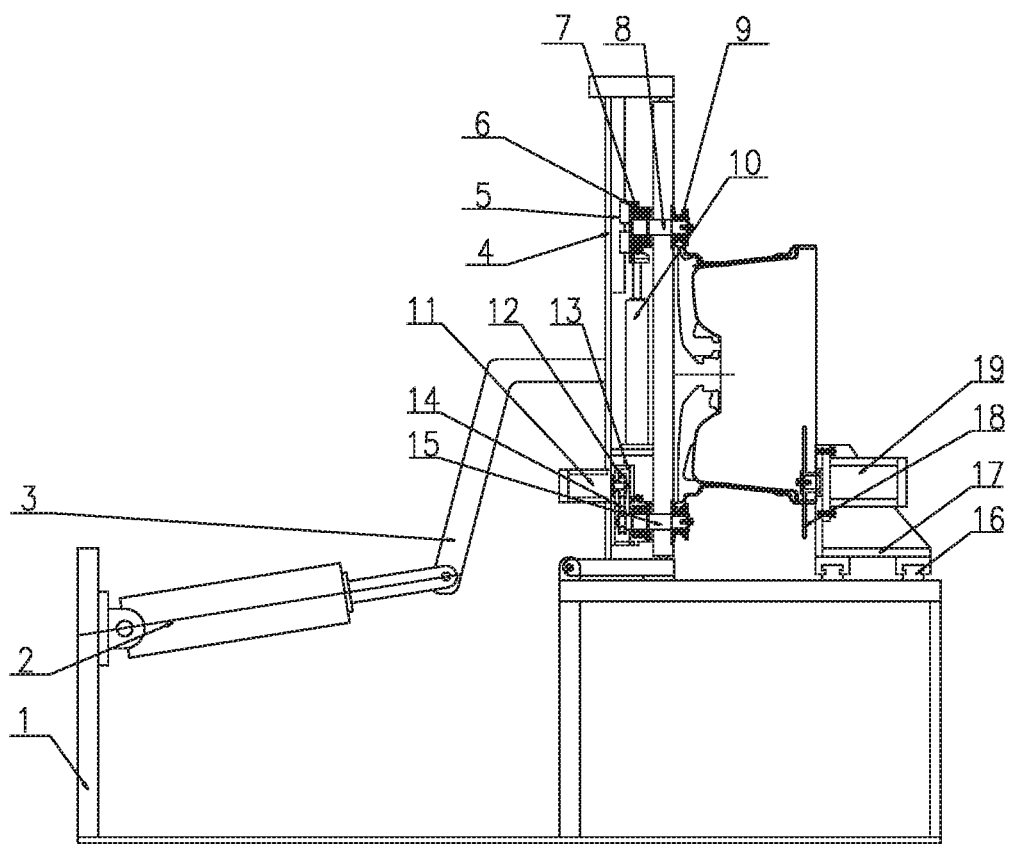
FIG. 3 is a front view of an improved online cutting device for a wheel spinning flash of the present disclosure during working.

1: rack; 2: turnover cylinder; 3: connection rod; 4: top plate; 5: first guide rail; 6: left sliding plate; 7: bearing pedestal; 8: first shaft; 9: roller; 10: clamping cylinder; 11: first motor; 12: belt wheel; 13: base; 14: synchronous belt; 15: second shaft; 16: second guide rail; 17: support; 18: cutting blade; 19: second motor; 20: feed cylinder; and 21: bracket.

DETAILED DESCRIPTION

Details and working conditions of a specific device provided according to the present disclosure are described below in combination with accompanying drawings.

The device consists of a rack 1, a turnover cylinder 2, a connection rod 3, a top plate 4, a first guide rail 5, a sliding plate 6, bearing pedestals 7, first shafts 8, rollers 9, a clamping cylinder 10, a first motor 11, a belt wheel 12, a base 13, a synchronous belt 14, second shafts 15, second guide rails 16, a support 17, a cutting blade 18, a second motor 19, a feed cylinder 20 and a bracket 21. The sliding plate 6, above which the two bearing pedestals 7 are fixed, is connected with the top of the top plate 4 through the first guide rail 5. The first shafts 8, above which the rollers 9 are respectively mounted, are fixed in the bearing pedestals 7 through bearings. An output lever of the clamping cylinder 10 fixed above the top plate 4 is connected with the sliding plate 6. Similarly, the two bearing pedestals 7 are mounted above the base 13 fixed above the top plate 14, and the first motor 11 is fixed below the base 13. The second shafts 15, above which the rollers 9 are mounted and below which the belt wheel 12 is fixed, are fixed in the bearing pedestals 7 through bearings. The first motor 11 drives the two second shafts 15 and the wheel to rotate through the synchronous belt 14.

A cylinder body of the turnover cylinder 2 is hinged to the rack 1, and an output lever of the turnover cylinder 2 is hinged with the connection rod 3 below the top plate 4. The support 17, on which the second motor 19 is fixed, is connected with a platform of the rack 1 through the second guide rails 16. The cutting blade 18 is fixed at the output end of the second motor 19. The feed cylinder 20 is fixed on the bracket 21 above the rack 1, and an output lever of the feed cylinder 20 is connected with the support 17. The second guide rails 16, the support 17, the cutting blade 18, the second motor 19 and the feed cylinder 20 form a cutting feeding unit of the device.

In a working process, a sensor initially locates the wheel; the clamping cylinder 10 enables the two first shafts 8 to move rightwards; the rollers 9 lift up the wheel away from a roller way and then clamp the wheel; the turnover cylinder 2 enables a turnover frame and the wheel to turn over by 90 degrees through the connection rod 3 to cause the wheel to be in a vertical state; then the first motor 11 drives the wheel to rotate; and after the spinning flash is removed under the action of the cutting feeding unit, the wheel may automatically fall into one side of the rack 1.

The invention claimed is:

1. A wheel spinning flash cutting device, comprising a rack, a turnover cylinder, a connection rod, a top plate, a first guide rail, a sliding plate, bearing pedestals, first shafts, rollers, a clamping cylinder, a first motor, a belt wheel, a base, a synchronous belt and second shafts, wherein the sliding plate, above which the two bearing pedestals are fixed, is connected with a top of the top plate through the first guide rail; the first shafts, above which the rollers are respectively mounted, are fixed in the bearing pedestals through bearings; an output lever of the clamping cylinder fixed above the top plate is connected with the sliding plate; the two bearing pedestals are mounted above the base fixed above the top plate, and the first motor is fixed below the base; the second shafts, above which the rollers are mounted and below which the belt wheel is fixed, are fixed in the bearing pedestals through bearings, the first motor drives the two second shafts and the wheel to rotate through the synchronous belt, the above components form a turnover frame of the device; a cylinder body of the turnover cylinder is hinged to the rack, and an output lever of the turnover cylinder is hinged with the connection rod below the top plate.

2. The cutting device according to claim 1, wherein after the wheel is located and clamped, the turnover frame and the wheel are turned over together by 90 degrees through the turnover cylinder to cause the wheel to be in a vertical state, and then the first motor drives the wheel to rotate; and after the spinning flash is removed under the action of a cutting feeding unit, the wheel may automatically fall into one side of the rack.

* * * * *